United States Patent
Takeyabu et al.

(10) Patent No.: US 6,775,524 B2
(45) Date of Patent: Aug. 10, 2004

(54) SIGNAL TRANSMITTING APPARATUS

(75) Inventors: Masato Takeyabu, Sapporo (JP); Yasuaki Takeuchi, Sapporo (JP); Yuji Kobayashi, Sapporo (JP); Seiji Miyoshi, Kawasaki (JP); Masahisa Yoshimi, deceased, late of Kawasaki (JP), by Michiyo Yoshimi, legal representative (73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 10/024,610

(22) Filed: Nov. 1, 2001

(65) Prior Publication Data

US 2002/0137482 A1 Sep. 26, 2002

(Under 37 CFR 1.47)

Related U.S. Application Data

(63) Continuation of application No. PCT/JP99/02674, filed on May 21, 1999.

(51) Int. Cl.[7] .............................................. H01Q 11/12
(52) U.S. Cl. .................... 455/127.1; 455/126; 375/295; 330/297
(58) Field of Search ............................. 455/127.1, 126, 455/108.93, 102.91, 572, 550.1, 575.1, 341, 282, 557; 330/279, 285, 298, 228, 149, 310, 269, 296–297, 136; 708/404, 802; 375/316, 296–297, 295, 259, 219, 362, 285, 361, 231, 346, 350, 220, 260, 229, 223, 269, 272, 322, 377, 312, 222, 318, 345; 370/317, 319, 525, 526, 421, 307, 478; 379/339, 347, 399, 398, 400, 401

(56) References Cited

U.S. PATENT DOCUMENTS 5,557,670 A * 9/1996 Perry et al. ................. 379/339
5,768,318 A * 6/1998 Mestdagh ................... 375/296
5,835,536 A * 11/1998 May et al. .................. 375/316
6,256,482 B1 * 7/2001 Raab .......................... 455/108
6,370,187 B1 * 4/2002 Agah ......................... 375/219
6,396,886 B1 * 5/2002 Kappoor ..................... 375/350

FOREIGN PATENT DOCUMENTS

| EP | 0 279 694 | 8/1988 |
|---|---|---|
| EP | 0 889 615 | 1/1999 |
| JP | 03226034 | 10/1991 |
| JP | 05007178 | 1/1993 |
| JP | 06141355 | 5/1994 |
| JP | 07202954 | 8/1995 |
| JP | 07307704 | 11/1995 |
| JP | 8-307385 | 11/1996 |
| JP | 09205408 | 8/1997 |
| JP | 09232890 | 9/1997 |
| JP | 10327576 | 12/1998 |
| JP | 10336711 | 12/1998 |
| WO | 95/34128 | 12/1995 |
| WO | 99/18662 | 4/1999 |

* cited by examiner

*Primary Examiner*—Edward F. Urban
*Assistant Examiner*—C. Chow
(74) *Attorney, Agent, or Firm*—Katten Muchin Zavis Rosenman (57) ABSTRACT

When a transmission-line driver circuit that transmits a signal to a transmission line is supplied with a power-supply voltage from a power-supply circuit, the value of the power-supply voltage is controlled based upon the amplitude of a signal output from the transmission-line driver circuit. For example, the maximum value of a signal input to the transmission-line driver circuit in time units delimited at fixed time periods is detected, the target value of power-supply voltage supplied to the transmission-line driver circuit is decided based upon the maximum value, and the power-supply circuit is controlled in such a manner that the target value of power-supply voltage and actual value of power-supply voltage will agree.

10 Claims, 12 Drawing Sheets

SIGNAL TRANSMITTING APPARATUS

This application is a continuation of PCT/JP99/02674 filed May 21, 1999.

TECHNICAL FIELD

This invention relates to a signal transmitting apparatus and, more particularly, to a signal transmitting apparatus for controlling the power-supply voltage of a transmission-line driving circuit, which transmits a signal to a transmission line, based upon the output signal amplitude of the transmission-line driving circuit.

BACKGROUND ART

A signal transmitting apparatus according to the prior art fixes the power-supply voltage, which is supplied to a transmission-line driving circuit (driver), at a certain value in conformity with the maximum value of the output signal amplitude. This method makes it possible to transmit a signal with little distortion. On the other hand, the average value of signal amplitude with respect to the value of the supplied power-supply voltage is small. As a consequence, the power of the transmitted signal with respect to the power consumed by the driver circuit is small and a problem that arises is poor power efficiency of signal transmission. In particular, with a multicarrier modulation method such as DMT (Discrete Multitone), described below, the ratio PAR (Peak Average Ratio) of momentary maximum output voltage of a signal to the average output voltage thereof is extremely high and the driver circuit is supplied with a high power-supply voltage owing to the momentary maximum value, which appears only rarely. Power efficiency, therefore, is low.

The ADSL (Asymmetric Digital Subscriber Line) scheme is a typical transmission scheme that uses DMT. In recent years, G.992.1 (G.dmt) and G.992.2 (G.lite) have been adopted as ADSL standards by the ITU. This will be described below taking G992.1 (G.dmt) as an example.

Figure 8:
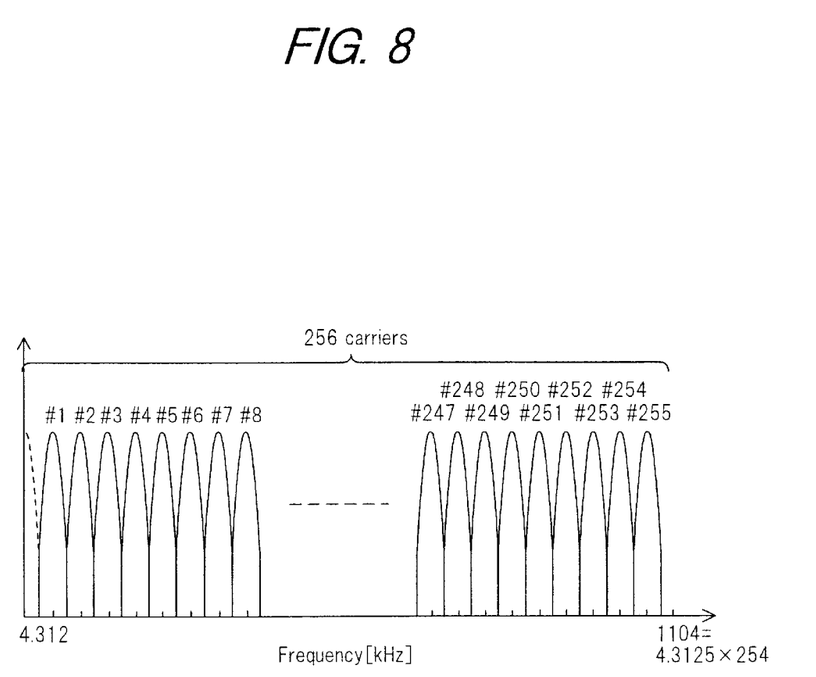
FIG. 8 is a diagram useful in describing a DMT transmission spectrum.

With DMT modulation, as shown in FIG. 8, a frequency band of 1.104 MHz is divided into M (M=256) multicarriers #1~#256 at intervals of Δf (=4.3125 KHz). The S/N ratios that prevail when a transmission is made in accordance with 4-QAM (Quadrature Amplitude Modulation) by each of the carriers #1~#256 are measured in advance and it is decided, depending upon the S/N ratios, with which modulation method among 4-QAM, 16-QAM, 64-QAM, 128-QAM ... modulation methods data is to be transmitted in each carrier. For example, 4-QAM is assigned to a carrier having a small S/N ratio and 16-QAM, 64-QAM, 128-QAM ... are assigned successively as the S/N ratio increases. It should be noted that 4-QAM is a modulation scheme in which two bits are transmitted at a time, 16-QAM a modulation scheme in which four bits are transmitted at a time, 64-QAM a modulation scheme in which six bits are transmitted at a time, and 128-QAM a modulation scheme in which seven bits are transmitted at a time.

Figure 9:
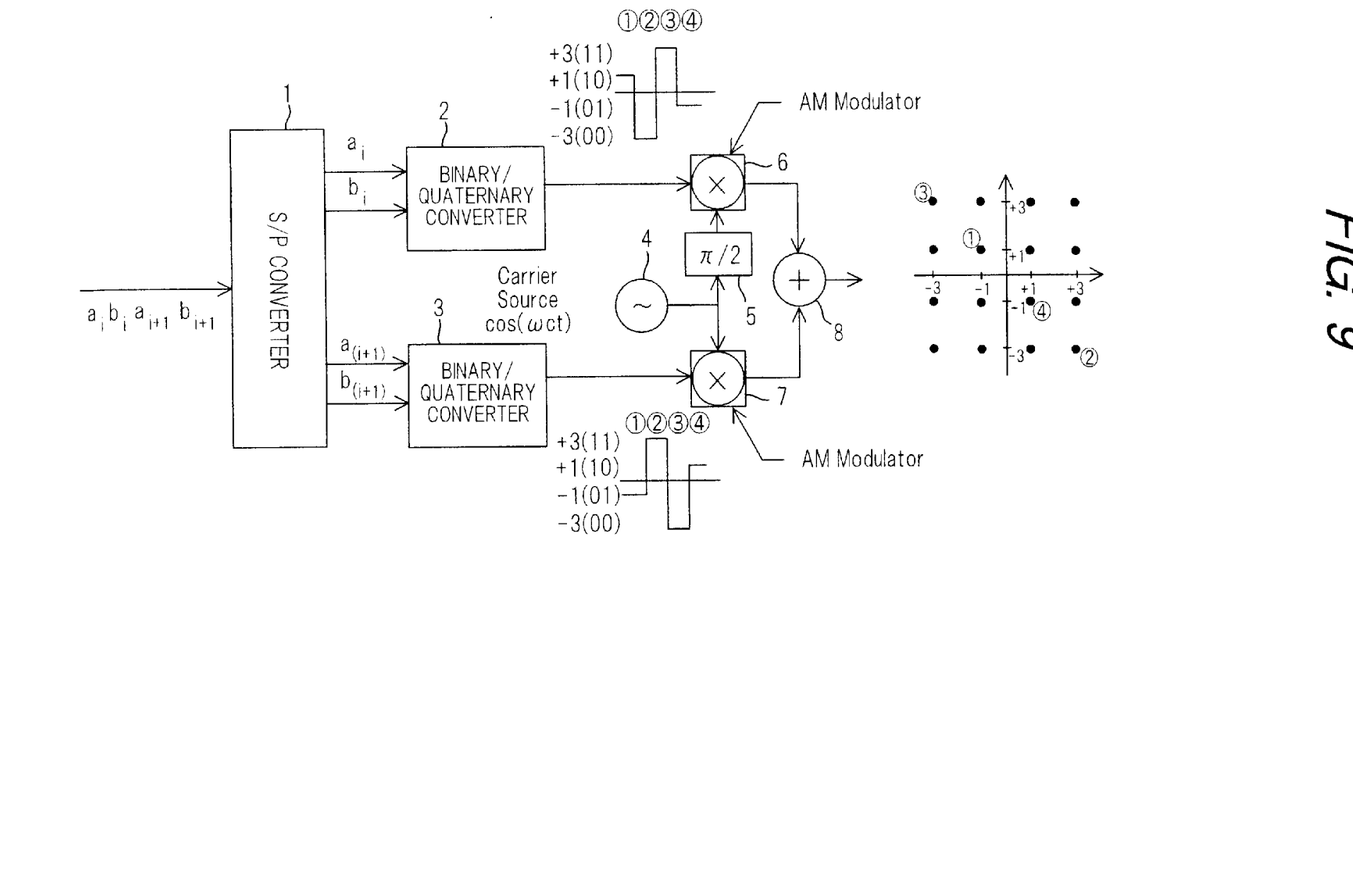
FIG. 9 is a diagram useful in describing 16-QAM.

FIG. 9 is a diagram useful in describing 16-QAM. A serial/parallel converter (S/P converter) 1 stores transmit data, which enters as a bit serial, in a buffer successively four bits at a time and outputs four bits as 2-bit parallel data $(a_i, b_i)$, $(a_{i+1}, b_{i+1})$. A first binary/quaternary converter 2 converts the parallel data $(a_i, b_i)$ to four values (−3, −1, +1, +3), and a second binary/quaternary converter 3 converts the parallel data $(a_{i+1}, b_{i+1})$ to four values (−3, −1, +1, +3). A carrier generator 4 generates a cosine wave cos ($\omega_c t$) of frequency $f_c$ ($\omega_c = 2\pi f c$), and a phase shifter 5 shifts the phase of the cosine wave by 90° to output a sine wave sin ($\omega_c t$). An AM modulator 6 multiplies the output of the first binary/quaternary converter 2 by the sine wave sin ($\omega_c t$), and an AM modulator 7 multiplies the output of the second binary/quaternary converter 3 by the cosine wave cos ($\omega_c t$). An adder 8 combines the outputs of the AM modulators 6 and 7 and outputs the combined signal. By executing the operation described above, the 16-QAM modulator outputs signals having the illustrated two-dimensional signal point placement (constellation) in accordance with the combination of parallel data $(a_i, b_i)$, $(a_{i+1}, b_{i+1})$. For example, if data divided into four bits at a time is 1001, 0011, 1100, 0110, the 16-QAM modulator outputs signals ①→②→③→④ in the constellation.

Figure 10:
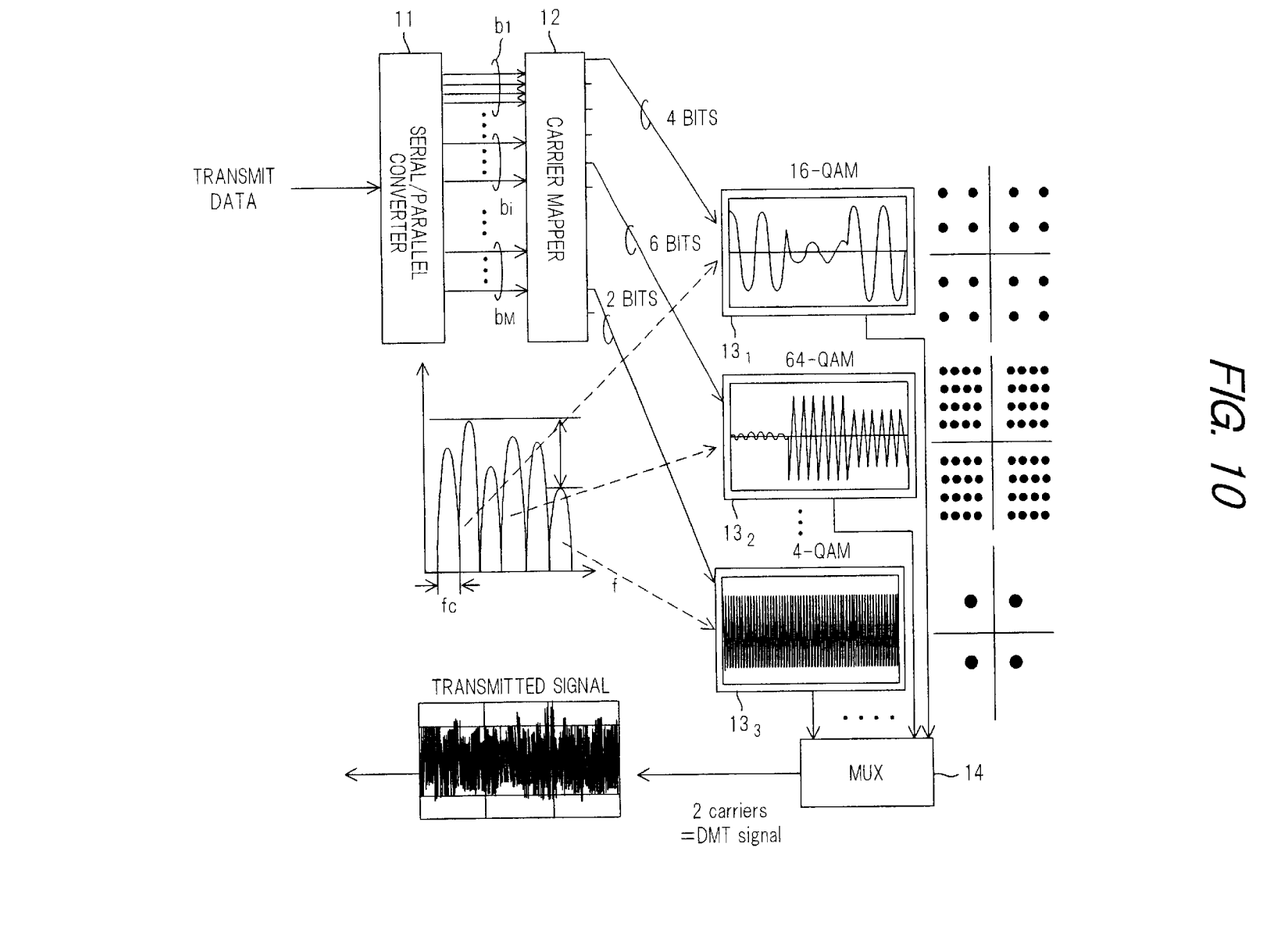
FIG. 10 is a diagram useful in describing the principle of a DMT transmission scheme.

FIG. 10 is diagram useful in describing the principle of DMT modulation. From bit-serial transmit data, an S/P converter 11 stores a bit sequence that is to be transmitted within a certain period in an internal buffer and subsequently outputs the bit sequence to a carrier mapper 12. Data transmitted within this fixed period is referred to as a symbol. Since the QAM modulation scheme of each carrier is known, the carrier mapper 12 divides the one symbol's worth of bit sequence $b_k$-number of bits at a time in accordance with the QAM modulation scheme of each carrier and inputs the resultant bit sequence to a QAM modulator 13i of the particular carrier. As a result, the total number of output bits per symbol is $\Sigma b_k$ (k=1 to M). In this case, the carrier mapper 12 performs the bit division of one symbol successively in accordance with the QAM modulation scheme of the carrier, starting from carriers having a low frequency. A frequency multiplexer 14 frequency multiplexes the QAM signals output from the QAM modulators 13i of the respective carriers and outputs the multiplexed signal to a transmission line via a transmission-line driver circuit (not shown).

Figure 11:
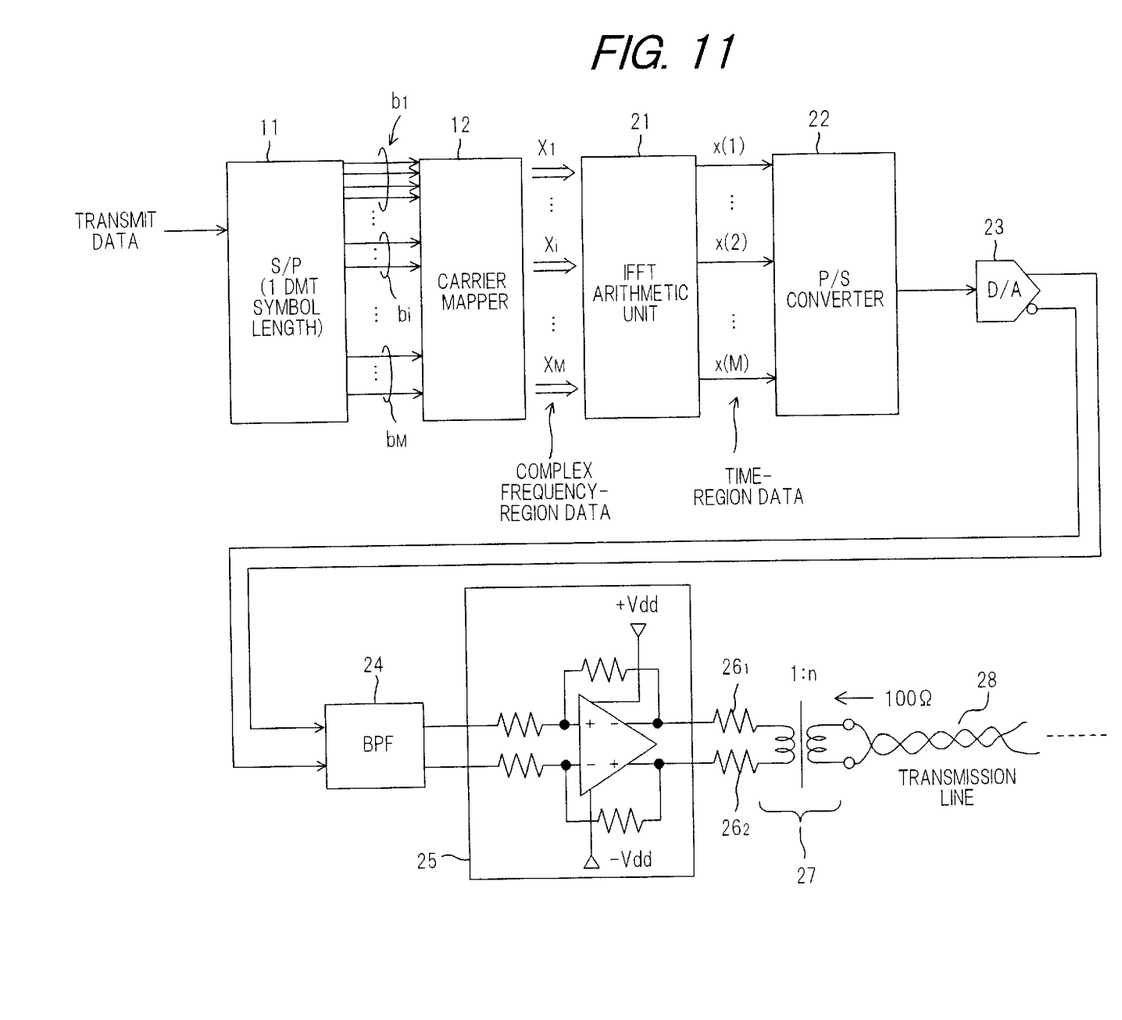
FIG. 11 is a basic structural view of a DMT transmission circuit.

With the method described above, the number of QAM modulators required is equal to the number of carriers. Let $X_{k1}$, $X_{k2}$ represent the first and second halves, respectively, of 2·$m_k$ bits input to a kth QAM modulator (k=1, 2, ..., M). If the following holds:

$$X_k = X_{k1} + jX_{k2}$$

then the output signal of the frequency multiplexer will be a real-number portion of an inverse Fourier transform of $X_k$. Accordingly, transmission based upon DMT modulation is carried out by providing an arithmetic unit, which implements an IFFT (Inverse Fast Fourier Transform), instead of QAM modulators the number of which is the number (M) of carriers. FIG. 11 is a basic structural diagram of a DMT transmission circuit having an IFFT arithmetic unit. Components identical with those of FIG. 10 are designated by like reference characters.

Figure 12:
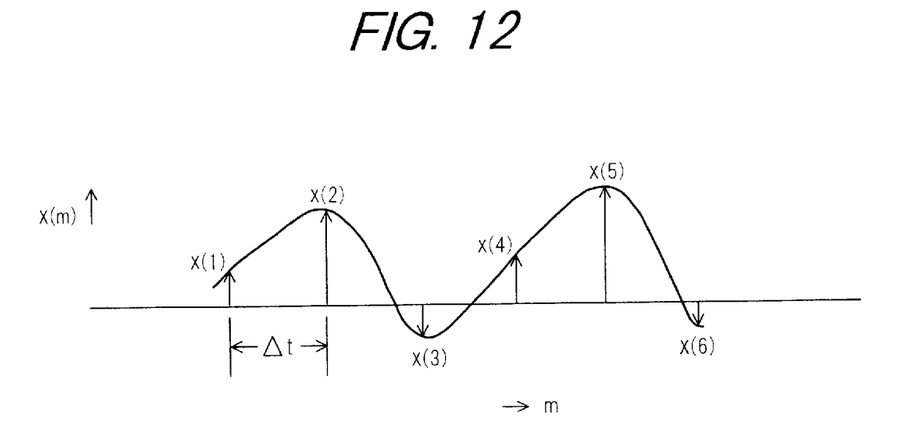
FIG. 12 is a waveform diagram of an IFFT output.

When data of a complex frequency region enters via the S/P converter 11 and carrier mapper 12, an IFFT arithmetic unit 21 converts the frequency signal (frequency-region signal) $X_k$ (k=1, 2, ... M) of each carrier to a time-region signal x(m) by an IFFT arithmetic operation. If the time-region signal x(m) is illustrated upon enlarging the time axis, the result will be as shown in FIG. 12, by way of example, where m represents time at discrete time intervals Δt and m per symbol is equal to 1 to M.

A parallel/serial converter (P/S converter) 22 holds M-number of items of time-region data x(1) to x(M), which are output from the IFFT arithmetic unit 21, in an internal buffer and outputs this data in the order x(1), x(2) ... x(M). A DA converter 23 converts the time-region data x(1), x(2) ... x(M) to an analog signal and outputs the analog signal as well as a signal obtained by reversing the polarity of this analog signal. A band-pass filter (BPF) 24 passes only the necessary band components contained in the signals output from the DA converter and inputs these components to a transmission-line driver circuit (driver) 25. The driver 25, which has the structure of a differential amplifier, differentially amplifies the input signals and outputs the results to a transmission line 28 via resistors $26_1$, $26_2$ and a transformer 27.

In the case of an FDM (Frequency Divided Multiplex) scheme in accordance with G992.1 (G.dmt), all 256 carriers are allocated for (1) the upstream direction from the subscriber to the office and (2) the downstream direction from the office to the subscriber; the number of carriers for the latter is 224. Further, symbol frequency fc (=1/Tc) is 4.3125 kHz, the upper limit of average signal power value of transmission over each carrier is −40 dBm/Hz, and the transmission-line transfer impedance is 100Ω. Consider voltage amplitude $V_{car}$ and power P of a transmit signal that has been DMT-modulated based upon these signals.

First, from $$V_{car} = (P \times Z)^{1/2},$$

signal amplitude Var for one carrier is $$V_{car} = \{10^{(-40/10)} \times 10^{-3} \times 4.3125 \times 10^3 \times 100\}^{1/2} = 208 \ [mV]$$

Accordingly, average amplitude $V_{avr}$ of the DMT signal is $$V_{avr} = (M \times V_{car}^2)^{1/2} = 3.11 [V]$$

In order to obtain the necessary BER (Bit Error Rate) $10^{-7}$, the PAR (Peak Average Ratio) must be made less than 18 dB. Accordingly, the following equation $$20 \ log(V_{max}/V_{avr}) = 18$$

holds and the maximum output amplitude $V_{max}$ is as follows:

$$V_{max} = V_{avr} \times 10^{18/20}$$
$$= 3.11 \times 10^{18/20} = 24.7 \ [V]$$

If it is attempted to send this maximum output amplitude signal to a line as is, a power-supply voltage of ±Vdd=±25 V, i.e., a voltage of 50 V or greater, will be applied to the driver 25. In consideration of the voltage withstand performance of the driver 25, actually the driver transmission voltage often is held to one-half of this using the transformer 27, the turns ratio of which is 1:2. However, even if the output amplitude of the driver 25 is reduced by the turns ratio of the transformer 27, it is still necessary that PAR=18 dB be satisfied. With DMT modulation, the probability that the maximum amplitude $V_{max}$ will occur is very low and the transition thereof is almost in the vicinity of the average value. As a consequence, the power efficiency of the transmission is very poor.

Power will now be considered specifically.

If the turns ratio of the transformer is 1:2, then the maximum output amplitude (on one side) of the driver 25 is $$24.7/2 = 12.4 [V]$$

and therefore a power supply of ±Vdd=±15 V is used. In this case, the driver transmission resistance value (primary resistance value) R is $$R = 100/2^2 = 25 \ \Omega$$

Since this resistance value is equal to the equivalent impedance of the line, the total impedance driven by the driver 25 is 25×2=50 Ω.

Accordingly, the power necessary for the driver 25 to output the average amplitude signal $A_{avr}$ is $$P = (V_{avr}/R) \times V = (3.11/50) \times 30 = 1.86 \ [W]$$

On the other hand, the power of the average amplitude signal is $$P' = (V_{avr}^2/R) = 3.11^2/50 = 193 \ [mW]$$

If P and P' are compared, it is obvious that almost all of the power is consumed by the driver 25 and that the portion used as the transmit signal is small, on the order of 1/10.

Thus, if a DMT-modulated signal is transmitted at a high, distortion-free quality by the above-described system, the power efficiency declines. In other words, with the prior art, a power-supply voltage that corresponds to the maximum amplitude of the transmit signal is always supplied to the driver even while the amplitude of the transmit signal is small. The result is poor power efficiency.

Accordingly, an object of the present invention is to make it possible to conserve power by raising the power efficiency of the transmission-line driver circuit (driver).

Another object of the present invention is to raise the power efficiency of the transmission-line driver circuit in a case where a multicarrier signal is transmitted, wherein the multicarrier signal is obtained by modulating carriers of multiple bands, the frequencies of which have been divided, by transmit data and combining the results.

DISCLOSURE OF THE INVENTION

When a transmission-line driver circuit, which transmits a signal to a transmission line, is supplied with a power-supply voltage from a power-supply circuit, the power-supply voltage value is controlled based upon the output signal amplitude of the transmission-line driver circuit. More specifically, the maximum value of a signal input to the transmission-line driver circuit in time units delimited at fixed time periods is detected, the target value of power-supply voltage supplied to the transmission-line driver circuit is decided based upon the maximum value, and a power-supply circuit is controlled in such a manner that the target value of power-supply voltage and actual value of power-supply voltage will agree. If this arrangement is adopted, the power-supply voltage can be controlled, at predetermined times, based upon the maximum amplitude of the signal input to the transmission-line driver circuit, i.e., the maximum amplitude of the signal output from the transmission-line driver circuit. As a result, it is possible to conserve power by raising the power efficiency of the transmission-line driver circuit.

In this case, the time unit's worth of the signal used to decide the target value of the power-supply voltage is accumulated and the accumulated signal is input to the transmission-line driver circuit in parallel with control of the power-supply voltage in such a manner that the target value of the power-supply voltage and the actual value of power-supply voltage will agree. If this arrangement is adopted, accurate power-supply voltage control based upon the maximum value of the signal output from the transmission-line driver circuit can be carried out.

Further, the target value of the power-supply voltage is decided so as to vary at a rate lower than that at which the maximum value in each time unit varies.

Figure 1:
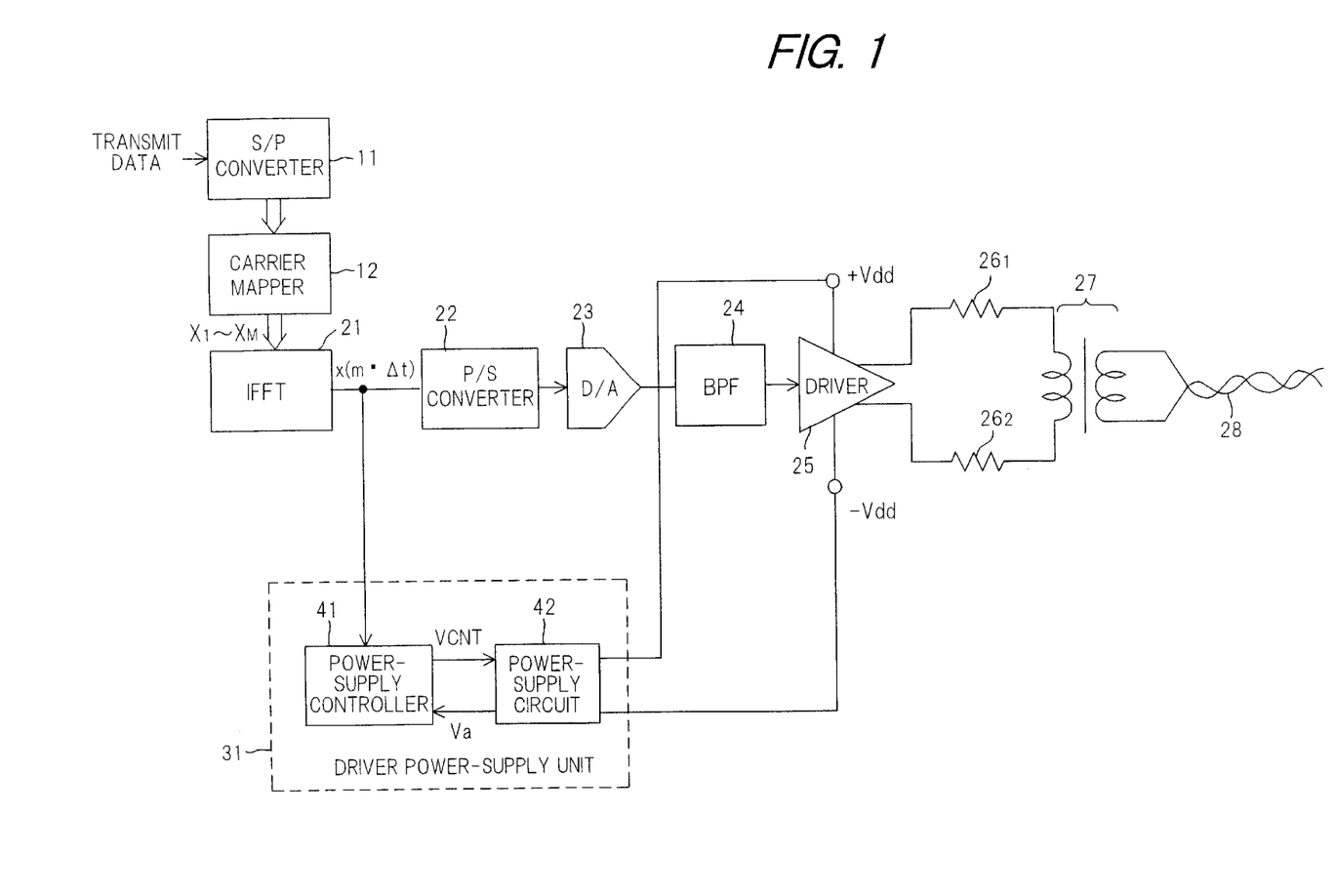
FIG. 1 is a signal transmitting apparatus having a power-supply unit for a driver.

BEST MODE FOR CARRYING OUT THE INVENTION (a) Structure of Signal Transmitting Apparatus FIG. 1 is a diagram showing the structure of a signal transmitting according to the invention having a power-supply unit for a driver. Components in FIG. 1 identical with those shown in FIG. 11 are designated by like reference characters. Numeral 11 denotes the S/P converter for subjecting transmit data to an S/P conversion, 12 the carrier mapper, 21 the IFFT converter for converting frequency-region data Xk (k=1, 2, . . . M) to a time-region signal x (m·Δt), 22 the P/S converter for holding M items of time-region data x(1·Δt) to x(M·Δt) [expressed as x(1) to x(M) hereafter], which are output from the IFFT arithmetic unit 21, in an internal buffer, and outputting this data in the order x(1), x(2) . . . x(M), 23 the DA converter for outputting a differential analog signal, 24 the band-pass filter (BPF), 25 the transmission-line driver circuit (driver), $26_1$, $26_2$ the driver transmission resistors, 27 the transformer, 28 a transmission line and 31 a driver power-supply unit for supplying the driver 25 with a power-supply voltage ±Vdd.

The driver power-supply unit 31 has a power-supply controller 41 and a power-supply circuit 42 which, under the control of the power-supply controller, generates the power-supply voltage ±Vdd supplied to the driver 25. The power-supply controller 41 (1) detects the maximum value of the signal that is input to the driver 25 in a time unit delimited at fixed time periods, i.e., the maximum value of the output signal from the IFFT arithmetic unit 21, (2) decides the target value of power-supply voltage ±Vdd based upon this maximum value, and (3) outputs a voltage control signal VCNT in such a manner that the target value of power-supply voltage and the actual value Va of power-supply voltage will agree. It should be noted that if the input signal of the driver 25 increases in size, then the output signal of the driver also increases. Therefore, deciding the target value of power-supply voltage based upon the maximum value of the driver input signal is equivalent to deciding the target value of power-supply voltage based upon the maximum value of the driver output signal.

The IFFT arithmetic unit 21 outputs one symbol's worth of data x(1), x(2) . . . x(M) converted to a time region by the IFFT operation, and the P/S converter 22 accumulates this data in an internal buffer before it is output to the driver 25 and subsequently outputs the data one item at a time. While the data sequence of one symbol is being accumulated in the buffer, the power-supply controller 41 decides the minimum target value of the power-supply voltage necessary to output this data sequence to the driver 25. When the data sequence is sent from the P/S converter 22 to the driver 25 via the DA converter 23, the power-supply controller 41 controls the power-supply circuit 42 in such a manner that the power-supply voltage of the driver will attain the target value. By adopting the operation described above, the power-supply voltage supplied to the driver 25 is regulated in accordance with the amplitude of the transmitted signal to the smallest value necessary, whereby power is conserved.

(b) Structure of Driver Power-Supply Unit

Figure 2:
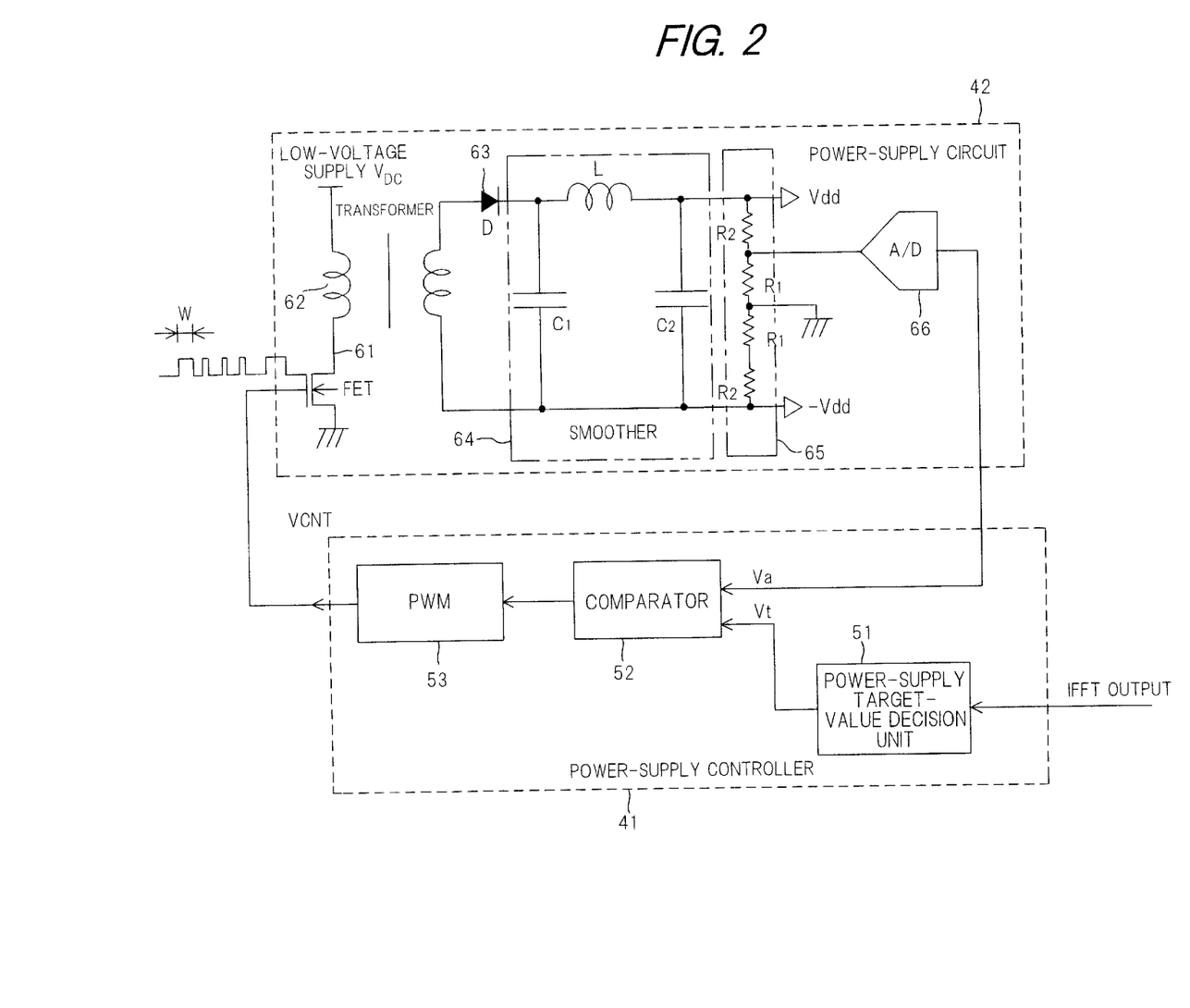
FIG. 2 is a structural view (digital implementation) of a power-supply unit for a driver.

FIG. 2 is a detailed diagram showing the structure of the driver power-supply unit. The power-supply controller 41 has a power-supply target-value decision unit 51, a comparator 52 and a pulse-width modulator (PWM) 53.

The power-supply target-value decision unit 51 detects the maximum value of the signal (the output signal of the IFFT arithmetic unit) that is input to the driver 25 in a time unit delimited at fixed time periods and decides the target value Vt of power-supply voltage Vdd, which is supplied to the driver, based upon this maximum value. It should be noted that the fixed time period is one-half the symbol time, by way of example. The comparator 52 compares the target value Vt of the power-supply voltage and the actual value Va of the power-supply voltage, and the pulse-width modulator 53 outputs the voltage control signal (pulse-width modulated signal) VCNT, which has a pulse width W that conforms to the difference between the two voltages. Because the power-supply controller 41 performs the above operation at the fixed time period, the power-supply controller 41 outputs a pulse train the pulse width W of which varies in accordance with the difference at this period.

The power-supply circuit 42 has a FET switch (Field-Effect Transistor Switch) 61 turned on and off by the voltage control signal VCNT to chop a DC low-voltage signal $V_{DC}$; a boosting transformer 62; a rectifying diode 63; a smoother 64 constructed by a coil L and capacitors $C_1$, $C_2$; an output resistor section 65 comprising serially connected resistors $R_1$, $R_2$; and an AD converter 66 for AD-converting an output voltage [=Vdd·$R_1$/($R_1$+$R_2$)], which is obtained by voltage division by the resistors R1, R2, and outputting this voltage as the actual value Va of power-supply voltage.

The larger the actual value Va of power-supply voltage than the target value Vt of power-supply voltage, the smaller the pulse width W of the voltage control signal VCNT. Conversely, the smaller the actual value Va of power-supply voltage than the target value Vt, the larger the pulse width W of the voltage control signal VCNT. The FET switch 61 turns on during the time that the voltage control signal VCNT is at the high level and turns off during the time that this signal is at the low level, thereby chopping the DC low-voltage $V_{DC}$ and generating an AC signal on the primary side of the transformer 62. The transformer 62 boosts this AC signal, the diode 63 rectifies the voltage signal on the secondary side of the transformer and the smoother 64 smoothes the rectified signal and outputs the power-supply voltage ±Vdd.

Thus, the power-supply controller 41 (1) decides the target value Vt of power-supply voltage based upon the maximum value of the signal input to the driver 25 in the unit time; (2) applies feedback control in such a manner that Va=Vt will hold, i.e., in such a manner that the power-supply voltage Vdd will diminish, by reducing the pulse width W if Va>Vt holds; and (3) applies feedback control in such a manner that Va=Vt will hold, i.e., in such a manner that the power-supply voltage Vdd will increase, by enlarging the pulse width if Va<Vt holds.

(c) Method of Deciding Power-Supply Target Value

Figure 3:
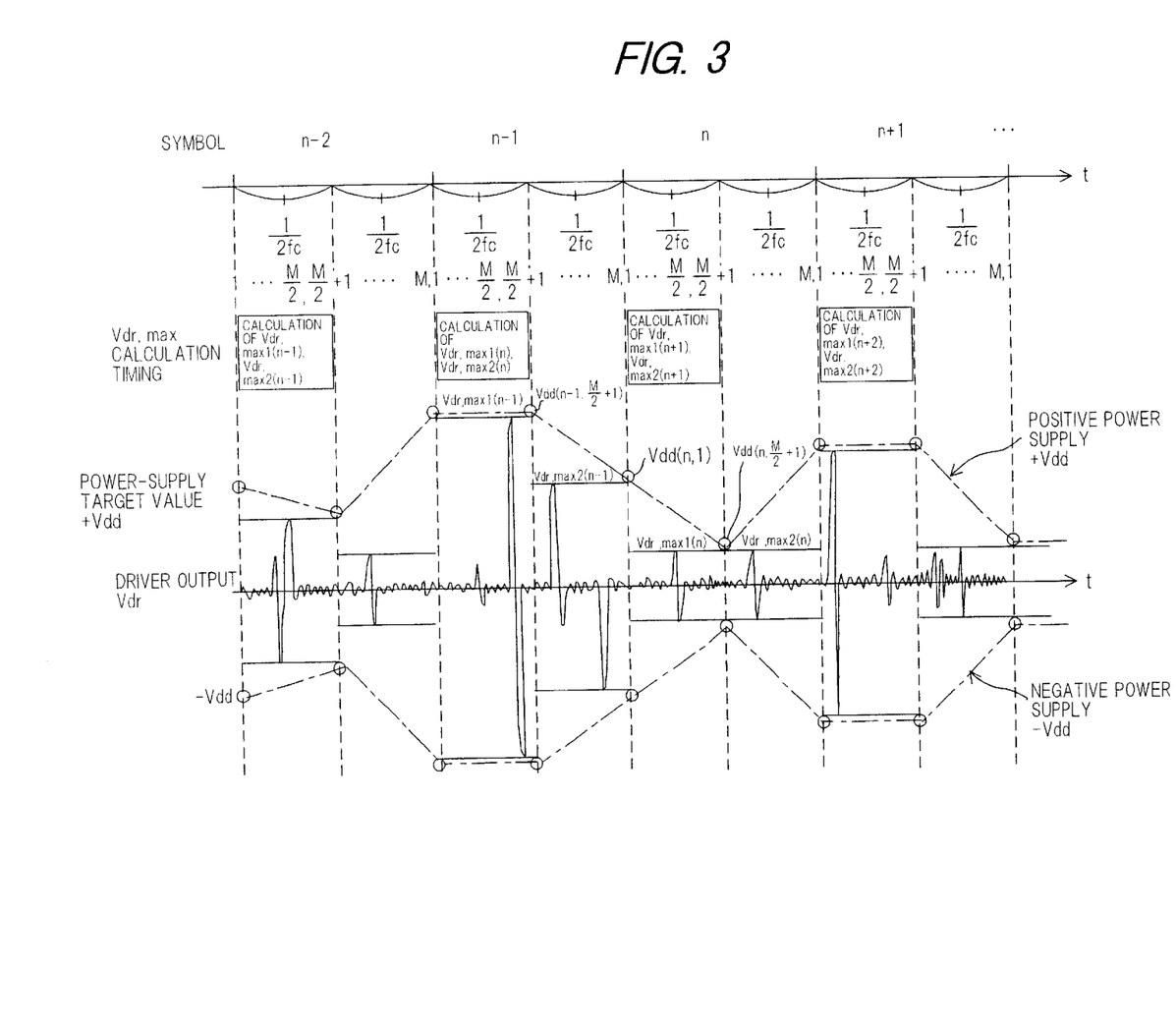
FIG. 3 is a diagram useful in describing decision of a power-supply target value.

FIG. 3 is a diagram useful in describing a method of deciding the target value of power-supply voltage. This illustrates a timechart of various signals in a case where the target value Vt of driver power-supply voltage is set in units of one-half symbol length.

The top row indicates the symbol numbers. If fc represents the symbol frequency, each symbol period is divided into a first half and a second half ½ fc at a time. Each symbol period is subdivided into M-number of discrete times (i=1 to M) at intervals of Δt.

Further, Vdr and Vdd represent driver output amplitude and power-supply voltage value, respectively. Since the input signal and output signal of the driver are proportional, processing for deciding the target value of power-supply voltage is executed while regarding the driver input signal (the time-region data output from the IFFT arithmetic unit) as being the driver output signal.

The mth discrete time in the nth symbol is expressed in the manner (n,m), where m is 1 to M. Further, the maximum value of Vdr in the first half of the nth symbol, i.e., at m=1 to (M/2), is expressed by $$Vdr,max1(n)$$

Similarly, the maximum value of Vdr in the second half of the nth symbol, i.e., at m=(M/2)+1 to M, is expressed by $$Vdr,max2(n)$$

where M is an even number.

(c-1) Processing for Calculating Maximum Values in First and Second Halves of nth Symbol While the P/S converter 22 is sending the M items of time-region data x(1), x(2) . . . x(M) of the (n−1)th symbol to the transmission line 28 via the driver 25 one item at a time, the IFFT arithmetic unit 22 converts the data of the complex frequency region of the nth symbol to time-region data. The power-supply target-value decision unit 51 detects the maximum values $$Vdr,max1(n), Vdr,max2(n)$$

of the first and second halves, respectively, of the nth symbol from the time-region data sequence output by the IFFT arithmetic unit 21. It should be noted that the power-supply target-value decision unit 51 completes the detection of these maximum values before time-region data x(1) to x(M/2) of the first halve of the (n−1)th symbol is finished being output by the driver 25.

Since the maximum value Vdr,max2(n−1) in the second half of the (n−1)th symbol has already been detected and retained, the data $$Vdr,max2(n-1), Vdr,max1(n), Vdr,max2(n)$$

will be ready at the moment the time-region data of the first half of the (n−1)th symbol finishes being output by the driver 25.

Using these items of maximum-value data, the power-supply target-value decision unit 51 decides a power-supply target value from discrete time (n−1, M/2+1) to (n−1, M) and a power-supply target value from discrete time (n,1) to (n,M/2) in accordance with the description that follows.

Described first will be a method of deciding the target value of the power-supply voltage from discrete time (n−1, M/2+1) to (n−1, M).

(c-2) Method of Deciding Target Value of Power Supply Voltage from Discrete Time (n−1, M/2+1) to (n−1, M)

The voltage Vdd(n,1) must exceed Vdr,max1(n) at time (n,1) [therefore Vdd(n,1)≧Vdr,max1(n) holds] so that the maximum value Vdr,max1(n) of the transmit signal may be generated at any time from time (n,1) to (n,M/2). Further, the power-supply voltage Vdd must exceed Vdr from time (n−1, M/2+1) to (n−1, M) [therefore Vdd(n,1)≧Vdr,max2(n−1) holds]. In order to satisfy the foregoing, it will suffice if the following holds:

$$Vdd(n,1)=\max\{Vdr,max2(n-1), Vdr,max1(n)\} \qquad (1)$$

Accordingly, in order to vary the power-supply voltage directly, the target value of the power-supply voltage is decided by $$Vdd(n-1, i) = [\{Vdd(n, 1) - Vdd(n-1, M/2+1)\}/(M/2)] \times \qquad (2)$$
$$(i - M/2 - 1) + Vdd(n-1, M/2+1)$$

where i=M/2+1 to M.

(c-3) Method of Deciding Target Value of Power Supply Voltage from Time (n,1) to (n,M/2)

The method of setting a target value of power-supply voltage from time (n,1) to (n,M/2) is considered to be similar. Specifically, the voltage Vdd (n,M/2+1) must exceed Vdr,max2(n) at time (n,M/2+1) [therefore Vdd(n,M/2+1)] ≧Vdr,max2(n) holds]. Further, the power-supply voltage Vdd must not exceed Vdr from time (n,1) to (n,M/2) [therefore Vdd (n,M/2+1)≧Vdr,max1(n) holds]. In order to satisfy the foregoing, it will suffice if the following holds:

$$Vdd(n,M/2+1)=\max\{Vdr,max1(n), Vdr,max2(n)\} \qquad (3)$$

Accordingly, in order to vary the power-supply voltage directly, the target value of the power-supply voltage is decided by $$Vdd(n, i) = [\{Vdd(n, M/2+1) - Vdd(n, 1)\}/(M/2)] \times \qquad (4)$$
$$(i - 1) + Vdd(n, 1)$$

where i=1 to M/2.

Figure 4:
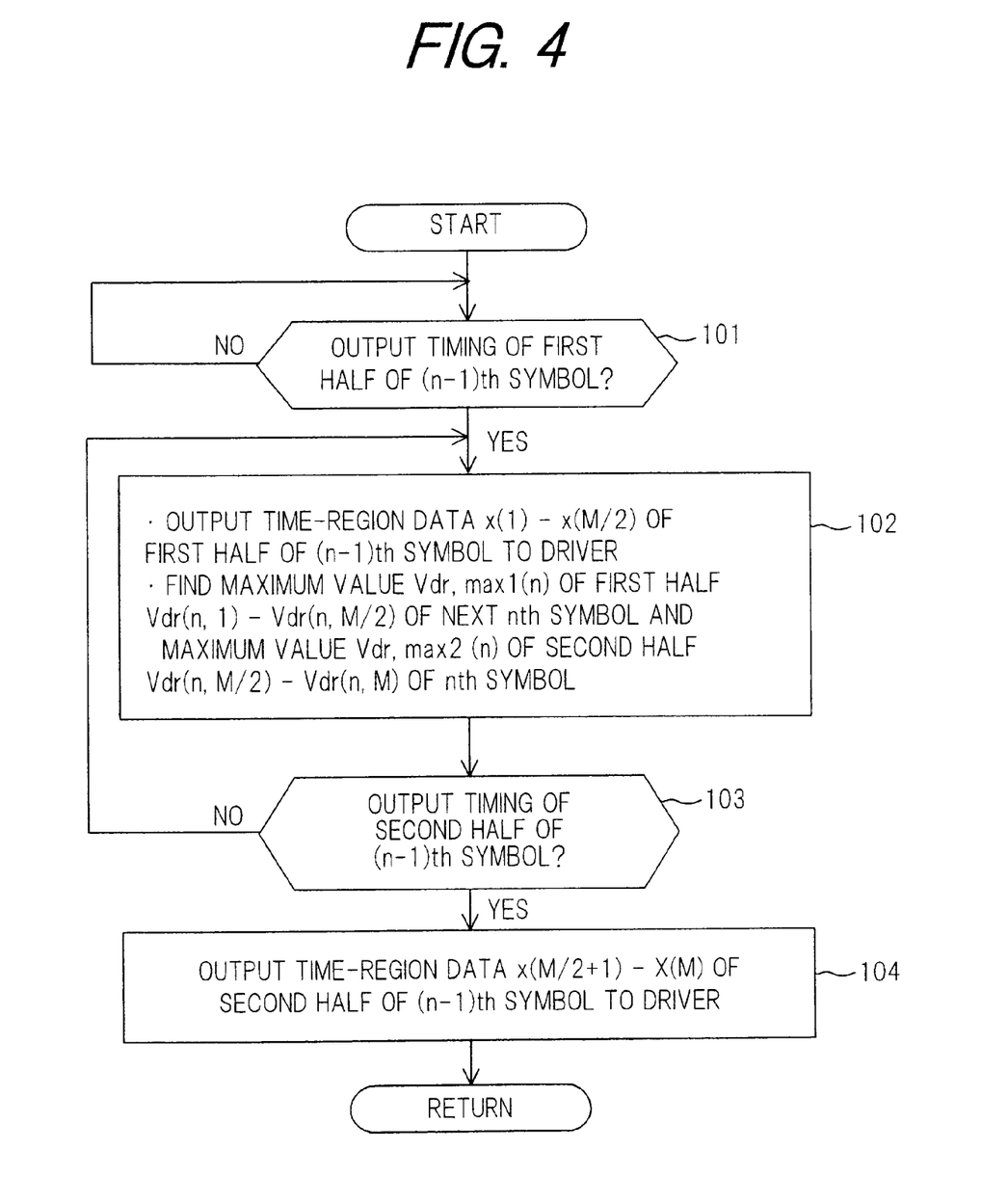
FIG. 4 is a flowchart of processing for calculating maximum values of first and second halves of an ensuing nth symbol.

(d) Processing for Calculating Maximum Values of First and Second Halves of Nth Symbol FIG. 4 is a flowchart of processing for calculating maximum values of first and second halves of the nth symbol.

Monitoring is performed to determine whether the timing for output of the time-region data sequence of the first half of the (n−1)th symbol has arrived (step 101).

If the timing for output of the time-region data sequence of the first half of the (n−1)th symbol has arrived, the P/S converter 22 outputs the time-region data x(1) to x(M/2) of the first half, which has been stored in the buffer, one item at a time, and the driver 25 sends the transmission line an analog signal conforming to these items of time-region data x(1) to x(M/2).

Further, in parallel with the foregoing, the power-supply target-value decision unit 51 finds the maximum values $$Vdr,max1(n), Vdr,max2(n)$$

of the first and second halves, respectively, of the nth symbol by referring to the time-region data sequences x(1) to x(M/2), x(M/2+1) to x(M) of the nth symbol output by the IFFT arithmetic unit 21 (step 102).

This is followed by performing monitoring to determine whether the timing for output of the time-region data sequence in the second half of the (n−1)th symbol has arrived (step 103).

If the timing for output of the time-region data sequence in the second half of the (n−1)th symbol has arrived, the P/S converter 22 outputs the time-region data x(M/2+1) to x(M), which has been stored in the buffer, one item at a time, and the driver 25 sends the transmission line an analog signal conforming to these items of time-region data x(M/2+1) to x(M) (step 104).

(e) Processing for Control of Power-Supply Voltage

Figure 5:
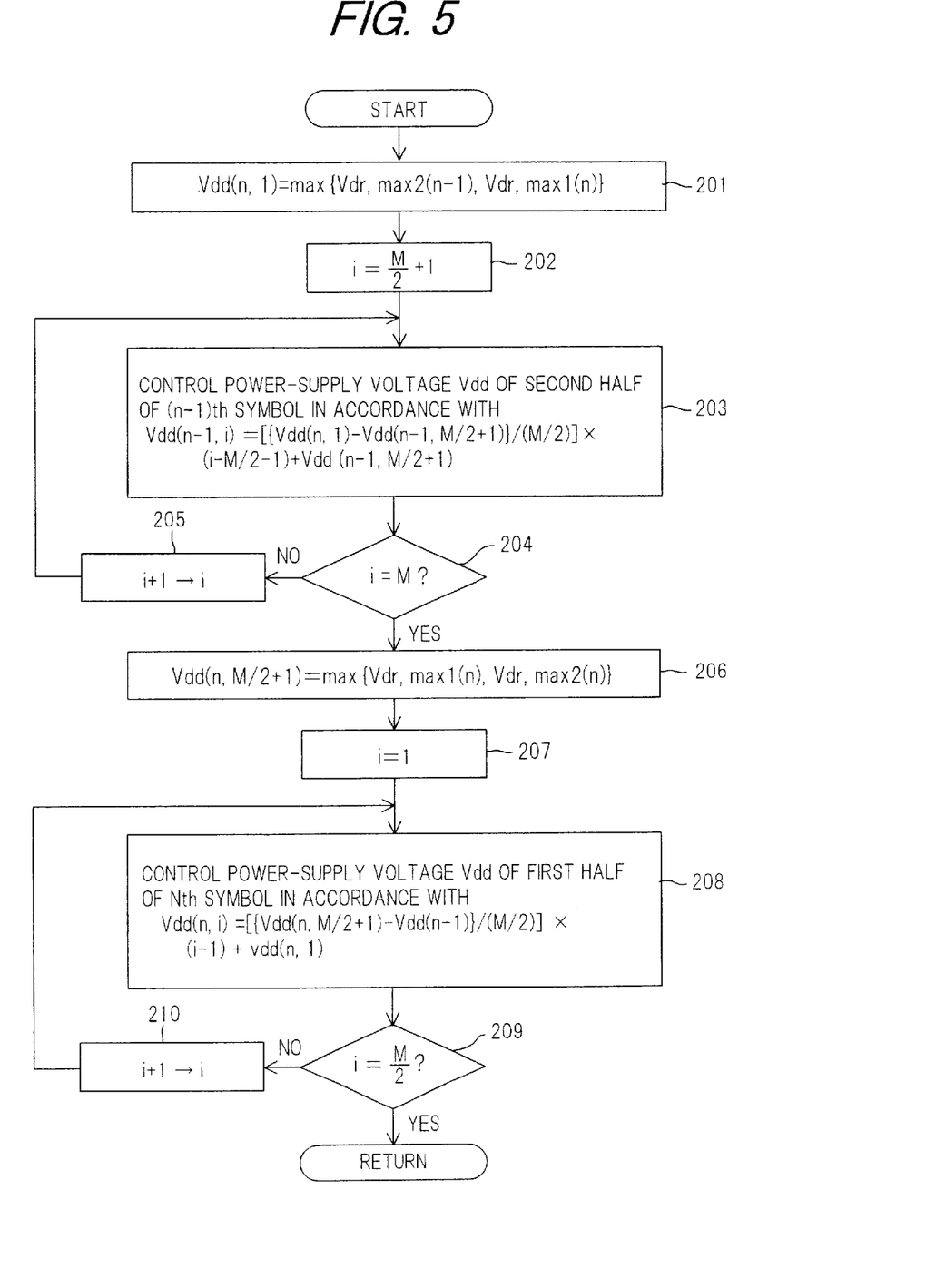
FIG. 5 is a flowchart of processing for controlling a power-supply voltage Vdd.

FIG. 5 is a flowchart of processing for controlling a power-supply voltage.

If the timing for output of the time-region data sequence in the second half of the (n−1)th symbol has arrived, the power-supply target-value decision unit 51 decides the target value Vdd(n,1) of the power-supply voltage at time (n,1) in accordance with Equation (1) using the already obtained maximum value Vdr,max2(n−1) of the second half of the (n−1)th symbol and the maximum value Vdr,max1(n) of the first half of the nth symbol (step 201).

Next, the power-supply target-value decision unit 51 performs the operation i=(M/2)+1 (step 202) and finds the target value Vdd(n−1,i) of the power-supply voltage at discrete time (n−1,i) in accordance with Equation (2). The power-supply controller 41 performs feedback control in such a manner that the power-supply voltage output from the power-supply circuit 42 becomes the target value Vdd(n−1,i) (step 203).

Upon elapse of time Δt, it is determined whether i=M holds (step 204). If i<M holds, i is incremented by the operation i+1→i (step 205) and processing from step 203 onward is repeated. Thus, the power-supply voltage Vdd of the driver 25 is smoothly controlled directly in accordance with Equation (2) in dependence upon the maximum value of the output signal.

If the relation i=M comes to hold, the output of the time-region data sequence of the second half of the (n−1)th symbol ends and the timing for output of the time-region data sequence of the first half of the nth symbol arrives, then the power-supply target-value decision unit 51 decides the target value Vdd(n,M/2+1) of the power-supply voltage at time (n,M/2+1) in accordance with Equation (3) using the already obtained maximum value Vdr,max1(n) of the first half of the nth symbol and the maximum value Vdr,max2(n) of the second half of the nth symbol (step 206).

Next, the power-supply target-value decision unit 51 performs the operation i=1 (step 207) and finds the target value Vdd(n,i) of the power-supply voltage at discrete time (n,i) in accordance with Equation (4). The power-supply controller 41 performs feedback control in such a manner that the power-supply voltage output from the power-supply circuit 42 becomes the target value Vdd(n,i) (step 208).

Upon elapse of time Δt, it is determined whether i=M/2 holds (step 209). If i<M/2 holds, i is incremented by the operation i+1→i (step 210) and processing from step 208 onward is repeated. Thus, the power-supply voltage Vdd of the driver 25 is smoothly controlled directly in accordance with Equation (4) in dependence upon the maximum value of the output signal.

If i=M/2 holds, control thenceforth returns to the start and processing from start onward is repeated.

If voltage control in units of one-half symbol length is performed, as described above, then the frequency components possessed by the voltage curve can be suppressed sufficiently. If the PSRR (power supply rejection ratio) performance of the driver is taken into consideration, effect upon the output signal of the driver is small even though power-supply voltage is controlled in the manner of the present invention. However, if the PSRR performance of the driver is not satisfactory, a correction should be applied in such a manner that the voltage target value obtained through the above process will describe a more gentle curve.

In the foregoing, a case is described in which the period of one symbol is divided equally into two sections (first- and second-half sections) of 1−M/2, M/2+1−M, respectively, the maximum value of the transmit signal is detected in each section and the power-supply voltage of each section is controlled in conformity with the maximum values. However, it is also possible to execute similar processing upon delimiting the two sections into mutually different lengths. Further, if n symbols (n≧1.0) are adopted as one section and power-supply voltage is controlled on a per-section basis, a fluctuation in power-supply voltage can be made more gentle and adverse influence upon the signal can be mitigated. In accordance with this method, however, there is an increase in delay and in the capacity of the storage means required. On the other hand, the smaller the processing time units, the more finely a change in signal amplitude can be dealt with and, hence, the more power can be conserved.

(f) Modification of Driver Power-Supply Unit

Figure 6:
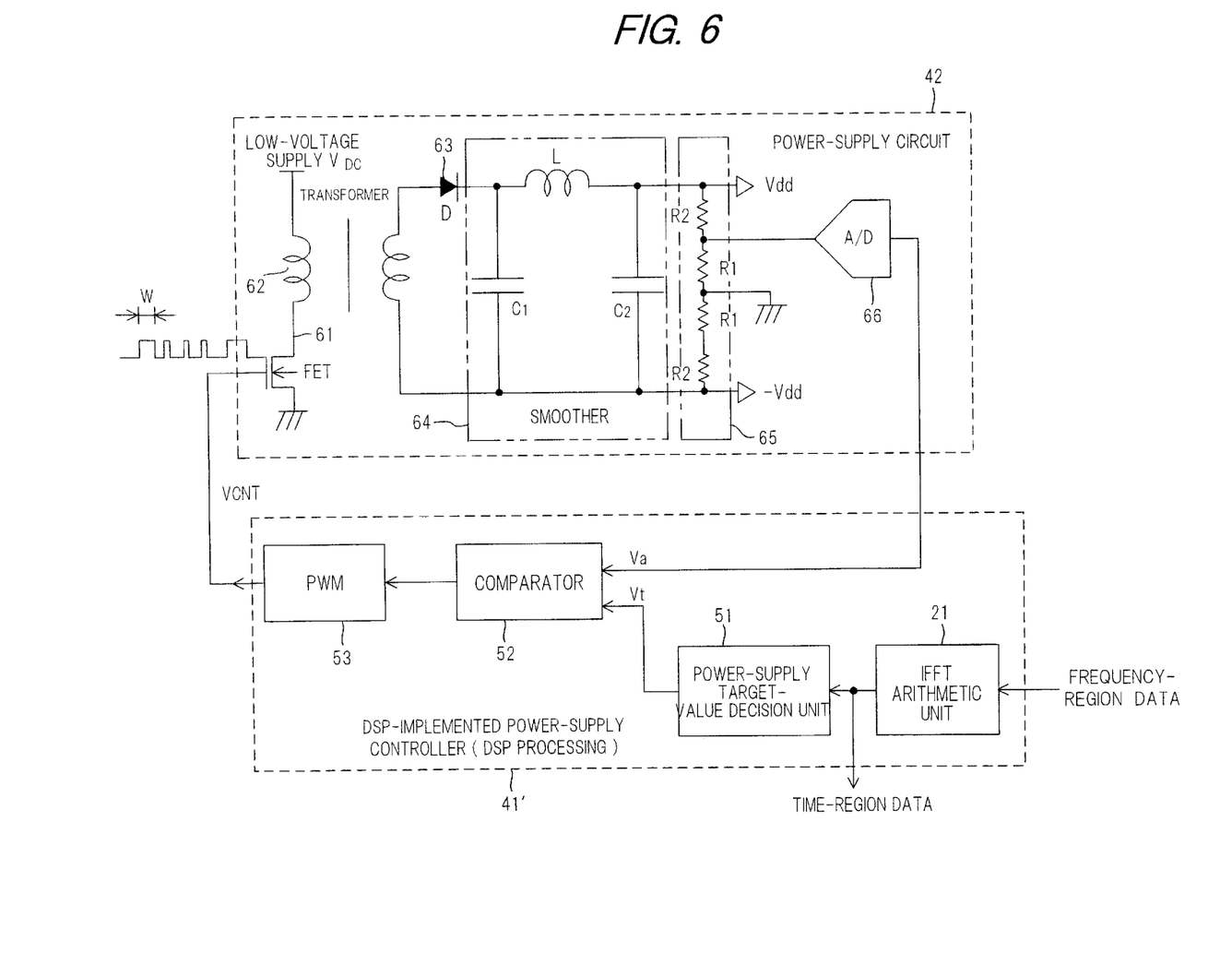
FIG. 6 is a modification of a power-supply unit for a driver.

In the foregoing, the IFFT arithmetic unit 21 and power-supply controller 41 are implemented by separate items of hardware, though these can be integrated by a DSP (Digital Signal Processor). FIG. 6 is a diagram showing the structure of a driver power-supply unit that uses a DSP. Components identical with those shown in FIG. 2 are designated by like reference characters. This modification differs in that the IFFT arithmetic unit 21, power-supply target-value decision unit 51, comparator 52 and pulse-width modulator 53 are constituted by a DSP. The target value of power-supply voltage is found by the DSP from the time-region data sequence obtained by IFFT processing, and feedback control is carried out in such a manner that the difference between the target value Vt and present value Va will become zero.

Figure 7:
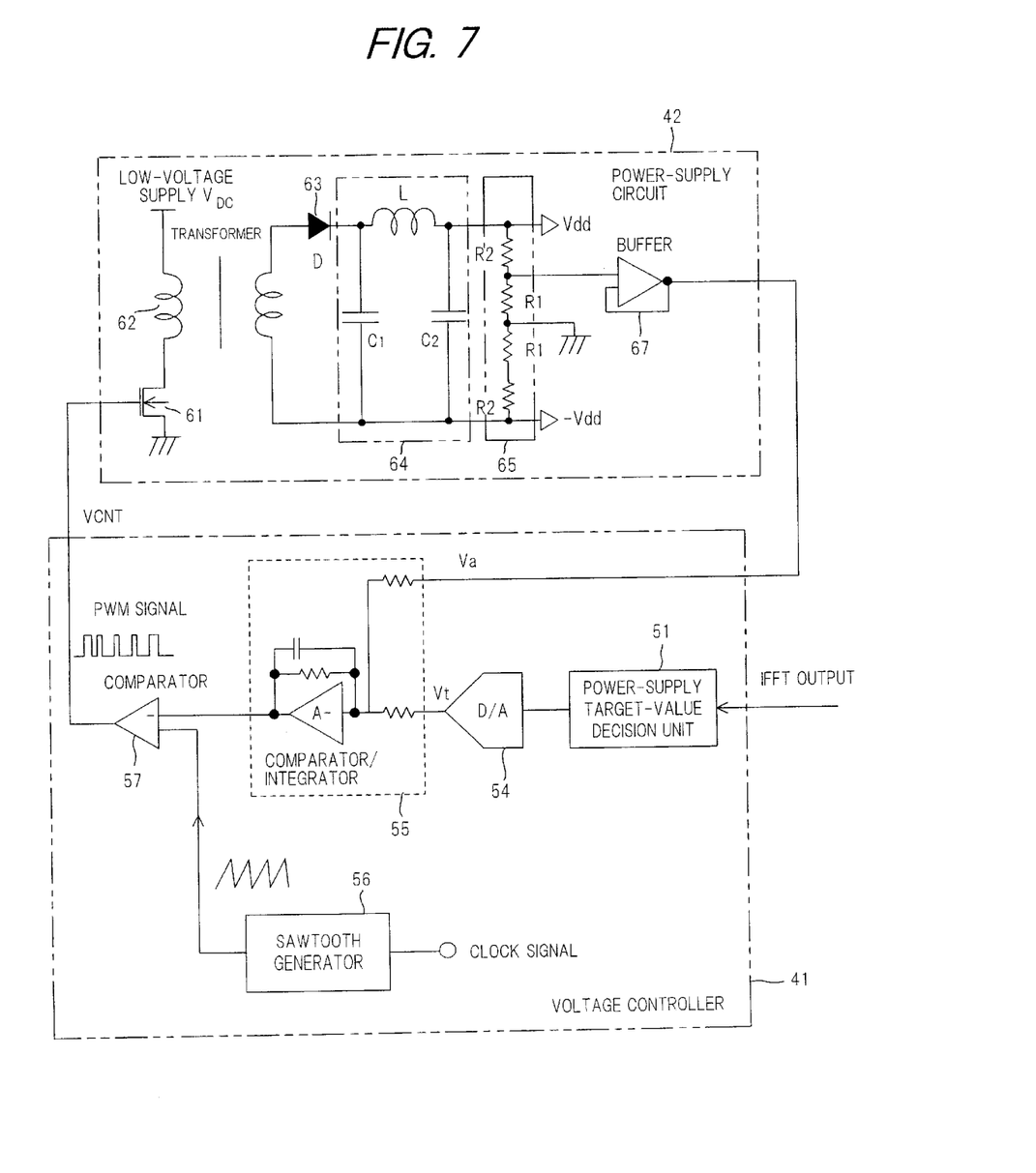
FIG. 7 is a structural view (analog implementation) of a power-supply unit for a driver.

Though the power-supply controller is implemented digitally above, analog implementation also is possible. FIG. 7 is a structural view of a driver power-supply unit having an analog implementation. Components identical with those shown in FIG. 2 are designated by like reference characters.

In the power-supply controller 41, the power-supply target-value decision unit 51 decides the target value of power-supply voltage Vdd by the method already described, and a DA converter 54 converts the target value of the power-supply voltage to an analog signal. A comparator/integrator 55 having the construction of an operational amplifier calculates the difference between the target value Vt of power-supply voltage and the actual value Va of power-supply voltage, smoothes this difference and outputs the result. A sawtooth generator 56 generates a sawtooth signal having a prescribed period, and a comparator 57 compares the sawtooth signal with the output of the comparator/integrator 55 and outputs the voltage control signal (pulse-width modulated signal) VCNT having a pulse width that conforms to the difference between the target value Vt of power-supply voltage and the actual value Va of power-supply voltage.

The power-supply circuit 42 has the FET switch 61, which is turned on and off by the voltage control signal VCNT to chop a DC low-voltage signal $V_{DC}$; the boosting transformer 62; the rectifying diode 63; the smoother 64 constructed by the coil L and capacitors $C_1$, $C_2$; the output resistor section 65 comprising the serially connected resistors $R_1$, $R_2$; and a buffer amplifier 67 for delivering the output voltage (=Vdd·$R_1$/($R_1$+$R_2$)) obtained by voltage division by the resistors R1, R2.

The DA converter 54 and comparator/integrator 55 correspond to the comparator 52 of FIG. 2, the sawtooth generator 56 and the comparator 57 correspond to the pulse-width modulator 53 of FIG. 2, and the power-supply controller 41 performs voltage control similar to that of FIG. 2. The power-supply target-value decision unit 51 outputs the target value of power-supply voltage, the DA converter 54 converts the target value to an analog signal, and the comparator/integrator 55 compares the target value of power-supply voltage with the actual power-supply voltage, integrates the result of comparison and outputs the result. The comparator 57 compares the integrated output with the sawtooth signal and generates the voltage control signal VCNT that controls the FET switch 61. The FET switch 61 turns on during the time that the voltage control signal VCNT is at the high level and turns off during the time that this signal is at the low level, thereby chopping the DC low-voltage $V_{DC}$ and generating an AC signal on the primary side of the transformer 62. The transformer 62 boosts this AC signal, the diode 63 rectifies the voltage signal on the secondary side of the transformer and the smoother 64 smoothes the rectified signal and outputs the power-supply voltage ±Vdd. The buffer amplifier 67 feeds the voltage signal Va, which is proportional to the power-supply voltage ±Vdd, back to the power-supply controller 41.

In the embodiment described above, no margin is provided between the driver output amplitude Vdr and the power-supply voltage Vdd for the sake of simplicity. When the device is actually engineered, however, a margin is set by processing such as adopting a fixed difference or ratio between the two.

Further, a fixed voltage lower than that of the driver power-supply voltage is applied to circuits other than the driver. However, references to this have been deleted from the specification and drawings.

Thus, in accordance with the present invention, power-supply voltage input to a driver from a power-supply circuit is controlled based upon the amplitude of an output signal from a transmission-line driver circuit (driver). As a result, the power efficiency of the transmission-line driver circuit can be raised to make possible a reduction in power consumption.

Further, in accordance with the present invention, it is possible to raise the power efficiency of the transmission-line driver circuit in a case where a multicarrier signal is transmitted, wherein the multicarrier signal is obtained by modulating carriers of multiple bands, the frequencies of which have been divided, by transmit data and combining the results.

What is claimed is:

1. A signal transmitting apparatus having a transmission-line driver circuit for sending a signal to a transmission line, and a power-supply circuit for supplying said transmission-line driver circuit with power-supply voltage, comprising:
   a power-supply voltage controller for controlling a power-supply voltage value, which is output from said power-supply circuit, based upon amplitude of an output signal from said transmission-line driver circuit, wherein said power-supply voltage controller has:
   means for detecting a maximum value of a signal input to said transmission-line driver circuit in time units delimited at fixed time periods;
   means for deciding a target value of power-supply voltage, which is supplied to said transmission-line driver circuit, based upon said maximum value; and
   feedback control means for feedback-controlling the power-supply circuit in such a manner that said target value of power-supply voltage and actual value of power-supply voltage will agree.

2. A signal transmitting apparatus according to claim 1, wherein said signal transmitting apparatus further has accumulation means for accumulating a time unit's worth of the signal input to said transmission-line drive circuit; and
   the power-supply circuit is controlled by said control means in such a manner that the target value of power-supply voltage and the actual value of power-supply voltage will agree while inputting said accumulated signal from said accumulation means to the transmission-line driver circuit.

3. A signal transmitting apparatus according to claim 2, characterized in that said input signal is a multicarrier signal obtained by modulating carriers of multiple bands by transmit data, and combining the results.

4. A signal transmitting apparatus according to claim 2, characterized in that said signal transmitting apparatus further has:
   means for converting a multicarrier signal, which has been obtained by modulating carriers of multiple bands by transmit data and combining the results, from a frequency region to a time region, and inputting said time-region signal to said transmission-line driver circuit.

5. A signal transmitting apparatus according to claim 4, characterized in that length of a time unit of processing for the conversion from said frequency region to said time region in said conversion means is made the length of a time unit of processing for detecting the maximum value in said target-value decision means.

6. A signal transmitting apparatus according to claim 4, characterized in that a whole-number multiple of length of a unit of processing for the conversion from said frequency region to said time region is made the length of a time unit of processing for detecting said maximum value.

7. A signal transmitting apparatus according to claim 4, characterized in that a time obtained by dividing, into a plurality of intervals, length of a time unit of processing for the conversion from said frequency region to said time region is made the length of a time unit of processing for detecting said maximum value.

8. A signal transmitting apparatus according to claim 1, characterized in that said means for deciding the target value of the power-supply voltage detects the maximum value of an input signal up to a point ahead by a plurality of lengths of the time unit and decides the target value of the power-supply voltage in conformity with a transition of the maximum value.

9. A signal transmitting apparatus according to claim 1, characterized in that said means for deciding the target value of the power-supply voltage detects the maximum value of an input signal up to a point ahead by a plurality of lengths of the time unit and decides the target value of the power-supply voltage in such a manner that it will vary at a rate lower than that at which said maximum value varies.

10. A signal transmitting apparatus according to claim 1, characterized in that said control means has:
   means for monitoring the power-supply voltage output from said power-supply circuit;
   means for comparing an actual value of power-supply voltage obtained by said monitoring means with said target value of the power-supply voltage; and
   adjustment-signal generating means for inputting, to said power-supply circuit, a signal for adjusting the value of power-supply voltage, which is output from said power-supply circuit, in accordance with result of the comparison.

* * * * *